United States Patent [19]

Schatteman

[11] 4,224,646

[45] Sep. 23, 1980

[54] AUTOMATIC PREFERRED TAPE TRACK SELECTION FOR BI-DIRECTIONAL TAPE TRANSPORT

[75] Inventor: Etienne A. M. Schatteman, Wemmel, Belgium

[73] Assignee: Staar, S.A., Brussels, Belgium

[21] Appl. No.: 966,589

[22] Filed: Dec. 5, 1978

[30] Foreign Application Priority Data

Dec. 9, 1977 [FR] France .................................. 77 37208

[51] Int. Cl.² ............................................. G11B 15/48
[52] U.S. Cl. .................................. 360/74.2; 360/96.3
[58] Field of Search ...................... 360/74.2, 74.1, 96.1, 360/96.2, 96.3; 242/204, 208, 190, 191

[56] References Cited

U.S. PATENT DOCUMENTS

| | | | |
|---|---|---|---|
| 3,612,542 | 10/1971 | Marcinkus | 360/74.2 X |
| 3,781,019 | 12/1973 | Kikuchi | 360/96.2 |
| 3,810,240 | 5/1974 | Nozawat | 360/96.2 |
| 3,932,890 | 1/1976 | Ueki et al. | 360/96.2 X |
| 3,936,877 | 2/1976 | Maruyama et al. | 360/96.3 X |

Primary Examiner—John H. Wolff

Attorney, Agent, or Firm—Leydig, Voit, Osann, Mayer & Holt, Ltd.

[57] ABSTRACT

A bidirectional tape transport for tapes stored in cassettes with a control for starting the drive in a preferred direction when a cassette is inserted in the apparatus. For reversing the direction of tape movement, the polarity of the supply voltage to the motor is reversed and the tape drive and the drive train to the reel spindles are reversed in such a way as always to drive the take-up spindle. Such operations are achieved by energizing a reversing solenoid by an electrical pulse, which may be produced manually or automatically by a reel rotation detection circuit. To start the tape in the preferred direction, when a cassette is inserted, a two-way switch which senses the state of the bidirectional drive is used to connect a capacitor to a flip-flop when the switch is in a non-preferred position corresponding to the non-preferred state of the drive; the flip-flop produces a pulse which energizes the reversing solenoid and reverses the drive so that it operates the tape in the preferred direction, so that the tape is driven in the preferred direction regardless of which direction it happened to be driven when the apparatus was stopped.

3 Claims, 5 Drawing Figures

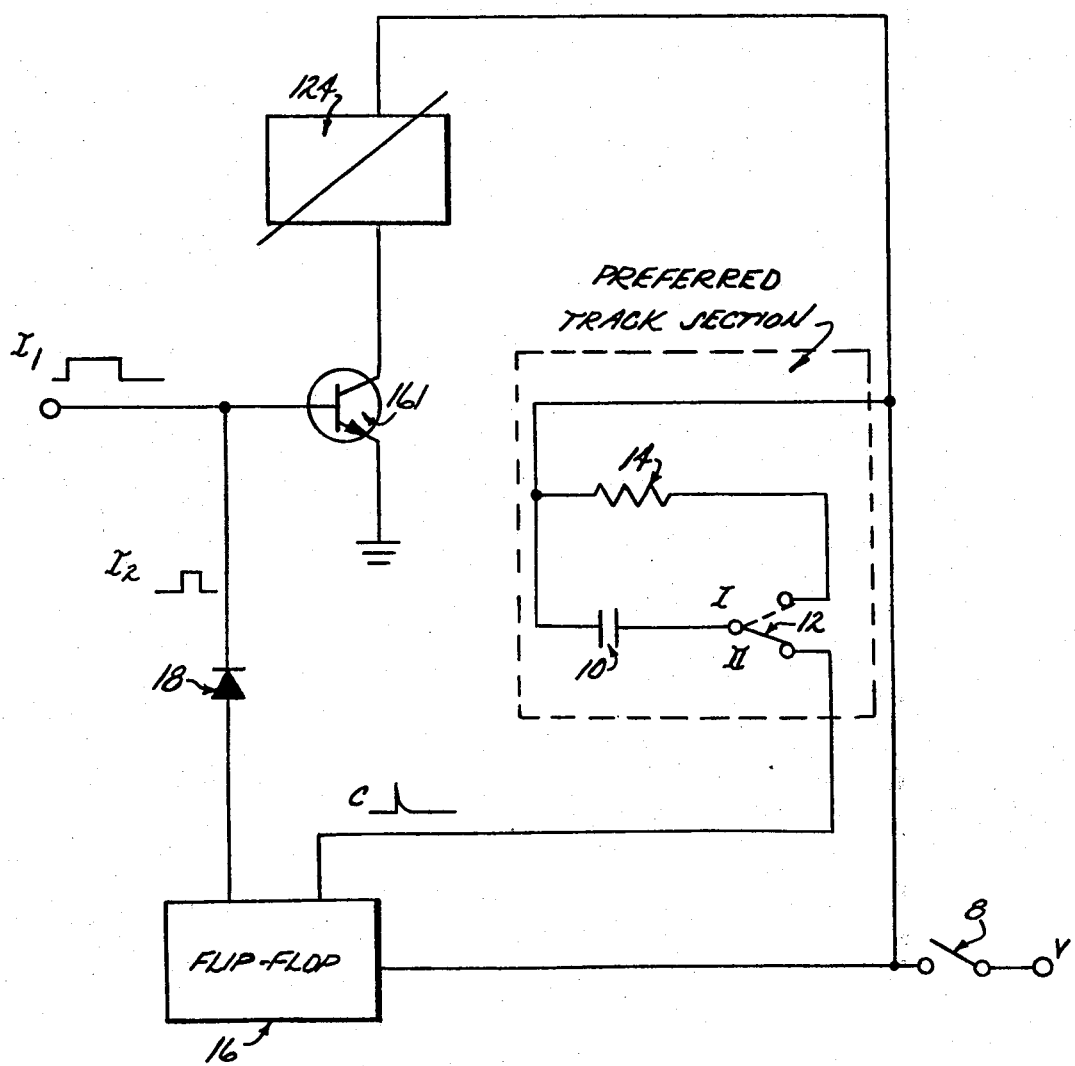

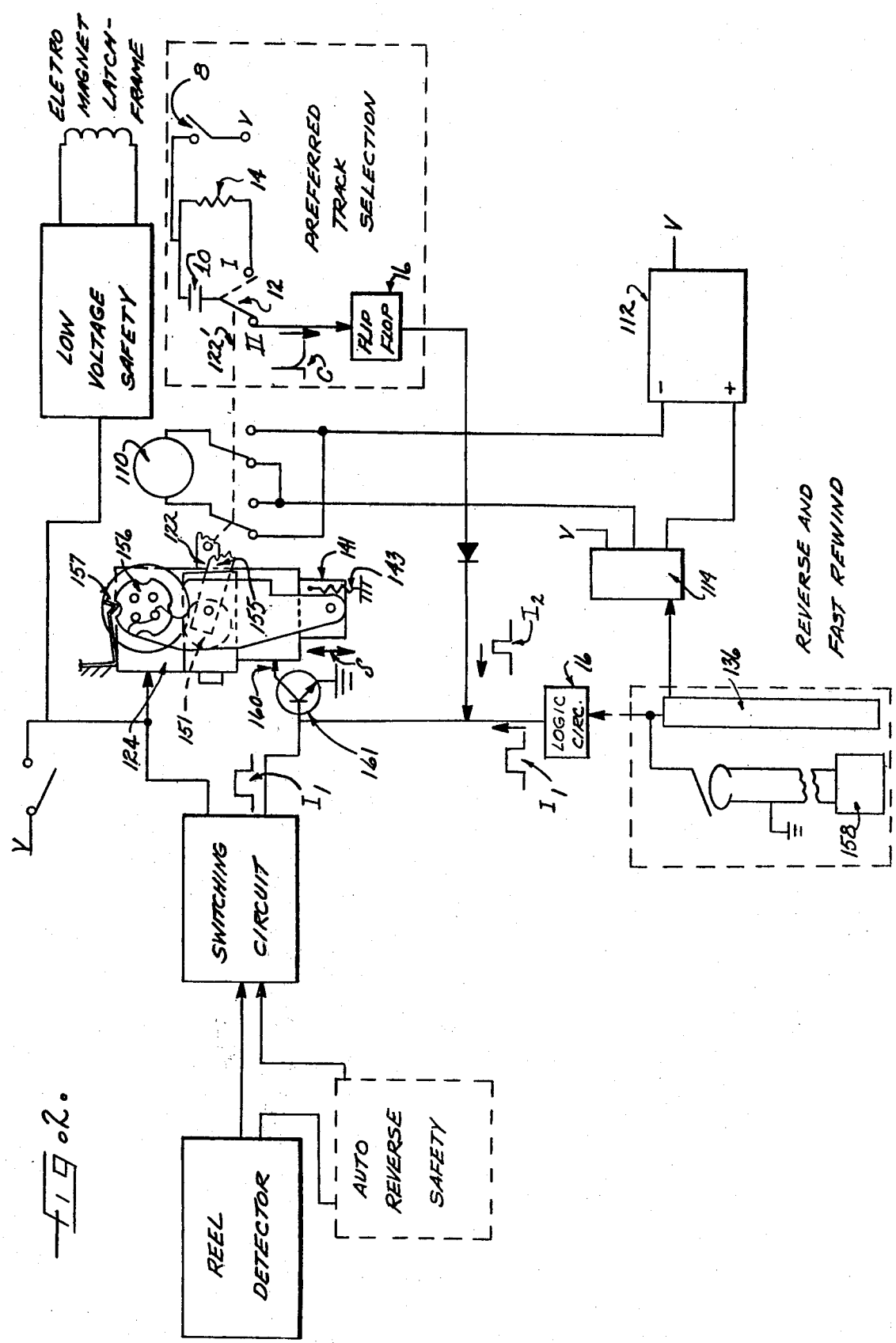

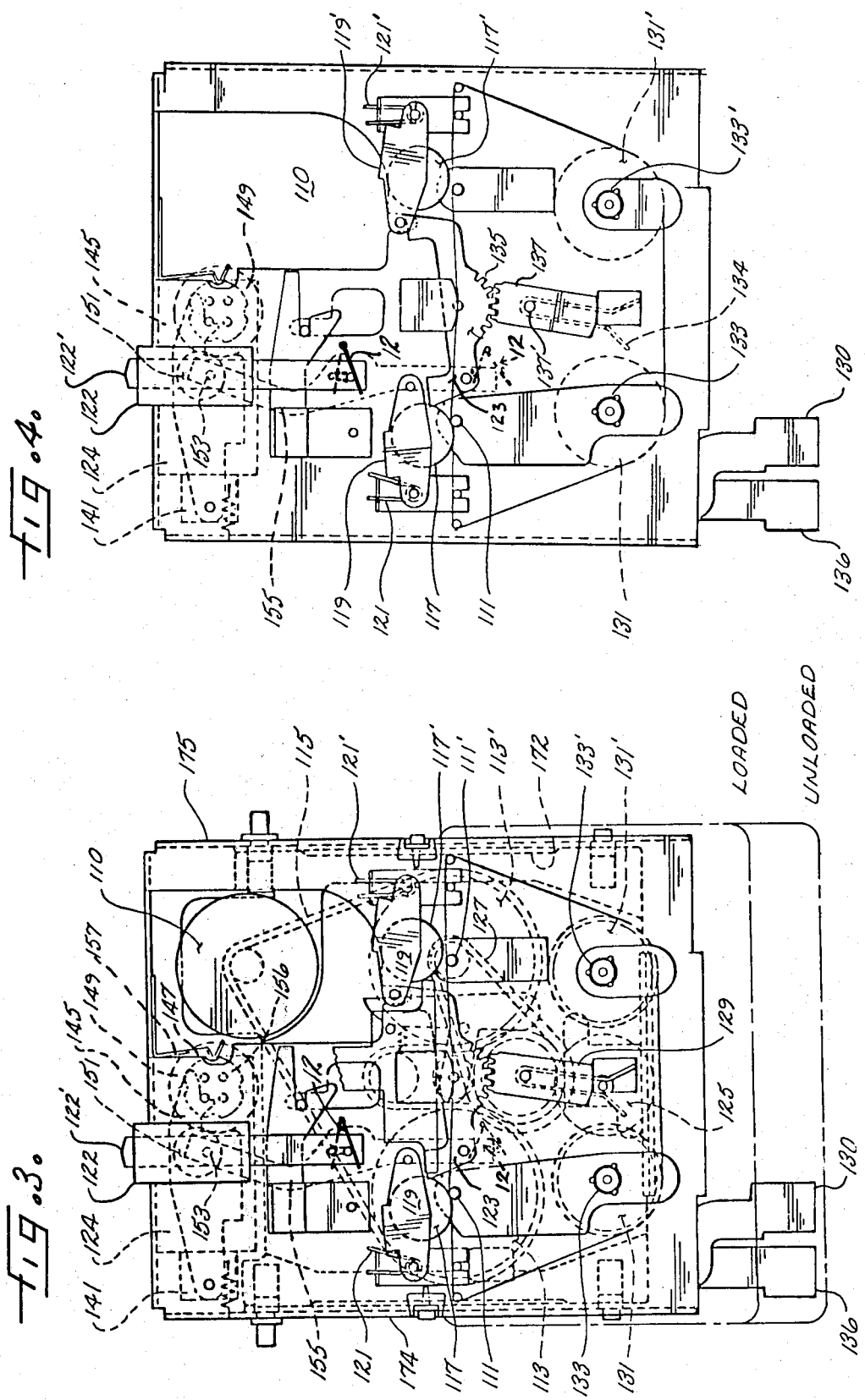

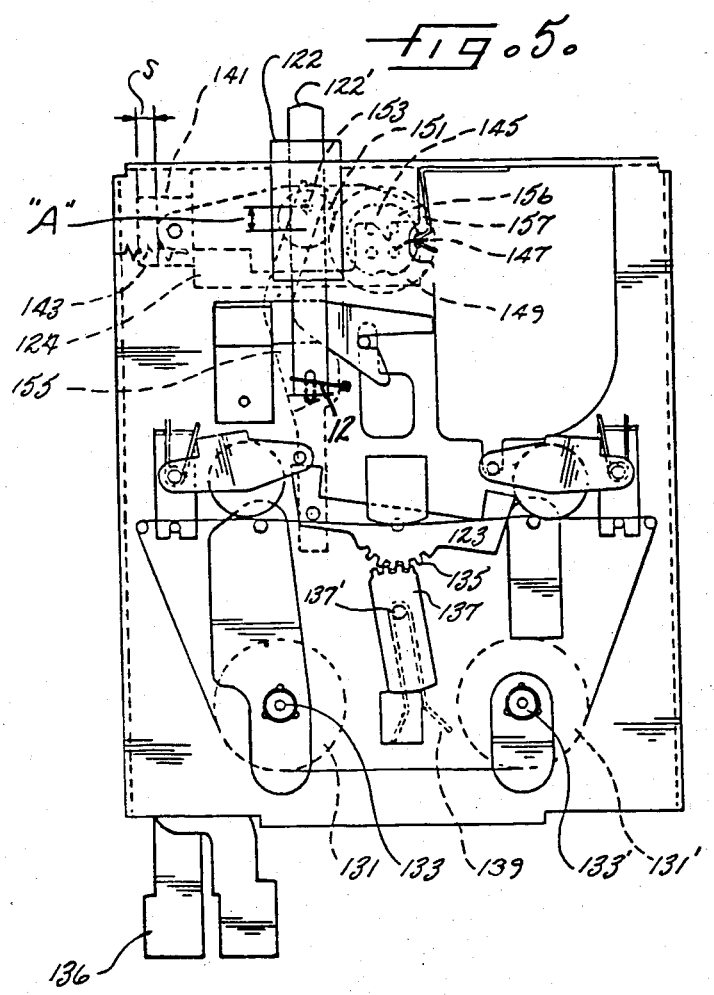

AUTOMATIC PREFERRED TAPE TRACK SELECTION FOR BI-DIRECTIONAL TAPE TRANSPORT

The present invention relates to tape cassettes recording and playback apparatus having drive mechanism providing bi-directional movement of the tape, particularly to such apparatus in which the magnetic tape is caused to move in a preferred direction upon insertion of cassettes in the apparatus.

Widespread commercial use has been made of bidirectional tape transports equipped with automatic stop systems of the kind shown in Schatteman U.S. Pat. No. 3,488,017 which detect from the rotational movement of the reels that the tape in a cassette has been completely transferred from one reel to the other; that is, the tape has been completely unwound from one of the reels and the end of the tape has been reached in one of the directions of movement, when the reels stop rotating. Such automatic stop systems have been used to stop the drive and eject the cassette at the end of the tape in one direction of movement, and have been employed with bidirectional drives to reverse the drive and eject the cassette after the end of the tape has been reached in the second direction of movement, so that both recording tracks have been recorded or played back. To stop the drive, or to carry out other functions, Schatterman U.S. Pat. No. 3,488,017 utilizes a solenoid energized by a pulse of current derived from electrically powered reel rotation detection and switching circuits. In copending application Ser. No. 906,311 filed May 16, 1978, apparatus is disclosed employing the same solenoid utilized for reversing the bidirectional normal speed drive, for reversing the direction of tape movement for fast rewind, and thereby relating the rewind direction of movement to the direction the tape is moving at normal speed when the rewind controls are actuated.

It is now proposed and it is an object to provide means employing the same solenoid for reversing the drive mechanism, for automatically causing the tape to move in a preferred direction upon insertion of cassettes, by selectively driving the solenoid according to the state of a switch which senses the position of the bidirectional drive, and thereby causes the direction of tape movement to be the same when cassettes are inserted regardless of which direction the tape happened to be moving when the previous cassette was ejected and the mechanism stopped.

According to the present invention there is provided control means for a magnetic tape recording and playback apparatus with a bidirectional tape transport providing tape movement in both directions and which includes a reversing means which reverses the direction of movement in response to an electrical pulse, the control means causing the magnetic tape to move in a preferred direction and including a pulse generator connected into the feed circuit of the apparatus and a two-way switch the positions of which correspond to the respective two directions in which the tape moves, so that each time the apparatus is switched on, a pulse is transmitted or not transmitted to the reversing means according to the position the said switch occupies.

In the preferred form of the invention the pulse generator comprises circuit means including a capacitor which, when a cassette is inserted, discharges a pulse which will be transmitted or not transmitted to the solenoid means for reversing the drive according to the state of a switch.

In apparatus of the type including the automatic stop means previously described and the manual reverse or rewind controls, it is also proposed, and one of the objects of the invention is to provide means to ensure that the pulses produced by the pulse generator are narrower than pulses produced manually or automatically when the end of the tape is reached, so that they can be masked by these latter pulses when they occur simultaneously at the terminals of the reversing solenoid means.

Other objects of the invention will be apparent from the following description read in connection with the accompanying drawings, in which:

FIGS. 1 and 2 are schematic circuit diagrams illustrating preferred embodiments of the present invention, in which automatic preferred tape track selection is achieved in a bidirectional tape transport by operating a reversing solenoid;

FIG. 3 is a plan view of a tape transport having a bidirectional drive, and illustrates the drive engaged to move the tape from reel to reel within a cassette in one direction at normal speed, and shows the reversing solenoid and mechaism for reversing the drive upon operation of the solenoid;

FIG. 4 is a plan view of the tape transport shown in FIG. 3, with components removed to reveal the capstan drive and the elements for shifting the direct drive to the take-up reel spindle, and elements for reversing the bidirectional tape transport mechanism;

FIG. 5 is a plan view similar to FIG. 4, with the bidirectional tape transport after having been shifted to reverse the direction of movement of the tape from the direction depicted in FIG. 4.

Now turning to the drawings, a preferred embodiment of the invention is illustrated in these Figures, with FIGS. 1 and 2 comprising diagrammatic control circuit drawings and FIGS. 3–5 comprising drawings of the tape transport employing the control circuits of FIGS. 1 and 2.

The invention is preferably incorporated as shown in FIGS. 1 and 2, in a control circuit means providing various controlled features in the exemplary tape transport. Thus, the control circuit components unique to the preferred track selection control means of the invention are located in the blocks labelled "Preferred Track Selection", and these circuit means operate with the other circuit components illustrated to achieve automatic preferred direction of tape movement upon insertion of cassettes. Other circuit means are shown such as "Reel Detector" and "Reverse and Fast Forward/Rewind" which are the subject of Schatteman U.S. Pat. No. 3,488,017 and application Serial No. 906,311, previously referred to.

TAPE TRANSPORT MECHANISM

In order to explain how the preferred track selection control means of this invention operates, reference is also made to FIGS. 3–5 which illustrate details of the tape transport. Thus, the tape transport drive motor 110 is supplied with a lower voltage for operating the tape at normal playback or recording speeds from a voltage and speed regulating circuit 112, and at a higher voltage V by shunting the circuit 112 when the fast forward and fast rewind functions are achieved. Referring to FIG. 3, the motor 110 drives the tape through a capstan drive, the capstans 111, 111' being carried on flywheels 113, 113' which are both driven in the same direction by a continuous belt 115. With the tape transport components in the position shown in FIG. 3, the motor 110 is rotating the flywheels and capstans counterclockwise. The capstan drive includes a pair of pinch rollers 117, 117' supported on pivotal mountings 119, 119'. One pinch roller 117 is engaged with its capstan 111 and pinches the tape. With the capstan drive engaged as shown in FIG. 3, the movement of the tape is from right to left in that Figure. The other pinch roller 117' is disengaged from its capstan 111' by the lever 123, which releases the engaged pinch roller 117 to the action of its spring 121.

The lever 123 also engages direct drive means with the take-up reel spindle related to the direction of tape movement determined by the engaged capstan drive. Since both capstans rotate in the same direction, to reverse the direction of tape movement the motor is reversed and the drive is shifted from one capstan to the other, and the direct drive for the reel spindles is also shifted so that what was originally the non-driven supply or take-off reel becomes the driven take-up reel. Referring to FIG. 3, with the motor and flywheels rotating in the counterclockwise direction, and the tape movement being from right to left in the Figure, the left hand reel spindle 133 serves as the take up reel spindle and is driven through an intermediate gear 125. The intermediate gear 125 is driven from one of the flywheels 113' by means of another belt and pulley system 127 and a gear 129 which meshes with and drives the intermediate gear 125. The intermediate gear 125 is movably mounted on the fixed frame to shift from engagement with a gear 131 operating the take-up spindle 133 (the left hand reel spindle in FIG. 3), to a position of engagement with the gear 131' operating the other reel spindle. The shifting of the intermediate gear 125 from direct drive engagement with the reel spindle gear 131 or 131' is carried out by movement of the lever 123 which rocks about a supporting shaft from the position shown in FIG. 3 to that illustrated in FIG. 5. To transmit the rocking motion of the lever 123 to the intermediate gear 125, the lever 123 bears a gear segment 135 which meshes with a gear segment on an arm 137 which rotates freely on an axis 137'. The arm 137 carries a fork 139 which engages the shaft (FIG. 3) of the intermediate gear 125 and moves the gear 125 from engagement with one of the gears 131 or 131' to the other (See FIGS. 4,5). The rocking movement of the lever 123 is utilized, therefore, to engage both the capstan drive and take-up spindle drive for one direction of tape movement, while disengaging the other capstan drive and direct drive to the other reel spindle.

For rocking the lever 123 from one position to the other, the present invention provides a solenoid 124 and means for transmitting the movement as the solenoid plunger 141 pulls in to the lever 123, herein shown as a pawl and crank mechanism.

Referring to FIG. 5, the pull in stroke of the solenoid plunger 141 from left to right is indicated at "S" as well as its return spring 143. When the solenoid 124 is energized its plunger 141 drives a pawl 145 from left to right which acts on one of four pins 147 carried by a gear 149. One forward stroke of the plunger 141 of the solenoid 124 rotates the gear 149 clockwise for a quadrant, and the pawl 145 returns, lifts and drops back down to its position behind the upper left most pin 147 as illustrated in FIG. 3 ready for the next stroke of the solenoid to rotate the gear 149 its quarter turn. Rotation of the gear 149 through one quadrant rotates a crank gear 151 180°, which rotates a crankpin 153 180° and moves the connecting rod 155 to the lever 123, the distance A to rock the lever 123 from one of its extreme positions, shown for example in FIGS. 3 and 4, to the other of its extreme positions, shown for example, in FIG. 5. In its transition from the position of FIG. 3 to FIG. 5, the lever 123 not only shifts the intermediate gear 125 so as to drive the reel spindle 133' but also disengages the left hand pinch roller 117 from its capstan 111, and allows the right hand pinch roller 117' under the urging of its spring 121' to engage its capstan 111'. A disc 156 with four recesses in its edge is fixed to turn with the pawl driven gear 149 and a detent 157 on the main frame engages in the recesses to hold the gear 149 against movement between operations of the pawl.

Referring to FIGS. 2, 3 and 4, the reversal of the polarity of the supply voltage to the motor 110 is insured by a slide switch 122 one part of which 122' is driven by the connecting rod 155. Each time the solenoid 124 is operated, the crank gear 151 moves the connecting rod 155 and thus the slider 122' from one position to the other to reverse the direction of rotation of the motor and reverse the direction of movement of the tape through the bidirectional tape transport, which involves shifting the direct drive from one reel spindle to the other so that the take-up spindle in the new direction of tape movement is operated by the drive motor through the direct drive means including the intermediate gear 125.

To energize the solenoid 124 and reverse the bidirectional drive, means are provided to complete a circuit from the power source V through the winding of the solenoid 124, herein shown as a reverse pushbutton 158 in FIG. 2 which when actuated produces a pulse $I_1$, through the logic circuit, which energizes the solenoid through any means desired such as by turning on a switching transister 161. With the transistor 161 turned on, a circuit is made through the solenoid winding from the voltage source V and the solenoid is energized to pull in its plunger 141.

The operation of the reverse pushbutton also, as diagrammatically illustrated in FIG. 2, operates the pawl 145 and crank mechanism (149, 151, 153) to shift the bidirectional drive and to invert the polarity of the voltage supplied to the motor 110 so that the capstan drive is engaged to move the tape in the new direction at normal speed, and the take-up reel spindle related to the new direction of tape movement is directly driven and the take-off spindle left relatively free to rotate.

As described in application Ser. No. 906,311, the tape playback and recording apparatus shown in FIGS. 2-5 in addition to providing means for reversing the direction of tape movement at normal speed, also provides selectively operable means for reversing the direction of tape movement and moving the tape at high speed to achieve a fast rewind function. As diagrammatically indicated in FIG. 2, operation of fast rewind controls 136 energizes the solenoid by completing a circuit through the solenoid winding from the voltage source V. The inverter switch 122 is shifted from one position to the other by the operation of the solenoid 124, reversing the bidirectional drive and the polarity of the voltage applied to the motor 110 thus reversing its direction of operation.

The solenoid 124 operates to reverse the bidirectional drive and disengage the engaged capstan drive by lifting the active pinch roller from its capstan. Thus, if the tape transport mechanism was in the position of FIG. 3 when the fast rewind pushbutton was actuated, a reversing contact is engaged which causes the solenoid 124 to be operated. This results in the position of the inverter switch 122 and bidirectional drive to be changed by the pulling in of the solenoid plunger 141, and the bidirectional drive components being shifted from the position of FIG. 3 to the position of FIG. 5.

PREFERRED TRACK SELECTION

Referring now to FIG. 1, the preferred direction of tape movement is achieved by operation of the reversing solenoid 124 which, on receiving a control pulse, causes the direction of passage of the magnetic tape to be reversed by reversing the polarity of the driving motor 110 (FIG. 2). Such pulses marked $I_1$, can be generated responsive to either manual operated means 136, 158 or the Reel Detector Circuit (see FIG. 2). Another pulse, marked $I_2$, is produced by means of the circuit according to the present invention in order to ensure a preferred direction of tape movement upon cassette insertion. These pulses are transmitted to the solenoid 124 via a power transistor 161.

The preferred track selection circuit is connected into the main feed line of the apparatus, on the voltage source V, across a main switch 8. This main switch 8 may, for example, be closed automatically responsive to the introduction of a cassette into the recording and playback apparatus.

A two-way switch 12 is associated with the bidirectional tape transport and controlled by an element thereof the position of which represents the direction of movement of the tape; thus, the switch 12 senses the state of the bidirectional drive mechanism. The two positions I and II of the switch 12 correspond to the two directions of movement of the tape, and position I corresponds to the preferred direction. When the switch 12 occupies position II and a cassette is inserted, thus closing the switch 8 at the same time, the voltage V is applied to one of the terminals of a capacitor 10 connected in series with the switch 12. The capacitor 10 discharges a pulse C which is applied across the switch 12 to the input of a monostable flip-flop 16, which produces a pulse $I_2$ which is applied, via diode 18 and the power transistor 161, to the solenoid 124, in order to reverse the drive mechanism and the direction of movement of the tape. As a result of this reversal of the drive mechanism and the direction of tape movement, the switch 12 moves from the initial position II to the position I shown in broken lines in FIG. 1. If the apparatus, upon insertion of a cassette, is in the operating state corresponding to a "nonpreferred" direction of tape movement, the circuit automatically produces a pulse $I_2$ which causes the direction of movement to be reversed, and the tape will then be driven in the "preferred" direction.

Referring to FIGS. 3–5, the switch 12 may be operated by any one of a number of elements of the mechanism, being shown for exemplary illustration operated by the lower end of the crank 155. The slide 122' has two positions: one position (shown in FIGS. 3 and 4) with the mechanism driving the tape from right to left, and a second position (shown in FIG. 5) driving the tape in the other direction. Either position of the switch 12 (both positions are shown in dashed lines) can be the position corresponding to the preferred direction, as desired; thus, the switch 12 has one position with the slide down as in FIGS. 3 and 4 and a second position with the slide raised as in FIG. 5.

If on the introduction of a cassette the two-way switch 12 occupies position I (FIGS. 1 and 2), corresponding to the preferred direction of motion, the capacitor 10 is short-circuited across a resistor 14 and no pulse will be transmitted to the input of the flip-flop 16. The apparatus will thus remain in a position corresponding to the preferred direction.

If, during the operation of the apparatus the reversing solenoid 124 receives a pulse $I_1$, set up manually or automatically, and by operating the drive moves the switch 12 from position I (the preferred position), to position II, a pulse C will be received at the input of the monostable flip-flop 16 at the moment when the switch 12 is applied to its terminal II. This pulse would thus cause a further reversal of direction i.e. the tape would then once again run in the preferred direction and the switch 12 would again be moved to its position I. In order to avoid this, the overall control circuit is so constructed that the pulse $I_1$ is longer than the pulse $I_2$, as shown in the drawing. The pulse $I_2$ is thus masked by the pulse $I_1$ and has no effect on the solenoid 124 so that the tape will continue to run in the nonpreferred direction and the switch will remain in position II.

The circuit of this invention, therefore, is so constructed to ensure that the tape will in all cases start up in the preferred direction, whatever the state of the apparatus when switched on, and will not interfere with a manual or automatic reversal of the drive and the direction of movement of the tape.

I claim as my invention:

1. In a recording and playback apparatus for tapes stored in cassettes, having a bidirectional drive with two states for transporting the tape in either of the two directions from either reel to the other of a cassette, and means including an electrically powered device operable in response to an electrical pulse for reversing said bidirectional drive; the improvement comprising means for controlling said bidirectional drive to move the tape in a preferred direction upon start of the drive, said control means including:

switch means having two states corresponding to the two states of said bidirectional drive, one state of said switch means corresonding to the non-preferred direction of tape movement, means shifting said switch means between states as said bidirectional drive is reversed by said electrically powered device, and pulse generating means connected to transmit a pulse through said switch means to said electrically powered device when said switch means is in the non-preferred state upon start of the drive, to reverse the drive and move the tape in the preferred direction.

2. An apparatus as claimed in claim 1, wherein said pulse generating means includes a capacitor which generates an actuating pulse through said switch means when said switch means is in the non-preferred state, and is discharged when said switch means is in the preferred state.

3. An apparatus as claimed in claim 1 or 2, further including control means generating a control pulse for reversing the drive, wherein the pulses generated by said pulse generating means are narrower than said control pulses so that the former pulses will be masked by the latter when they are received simultaneously by the electrically powered reversing device.

* * * * *